(12) United States Patent
Swanson et al.

(10) Patent No.: US 9,610,733 B2
(45) Date of Patent: Apr. 4, 2017

(54) ADDITIVE MANUFACTURING WITH SOLUBLE BUILD SHEET AND PART MARKING

(71) Applicant: Stratasys, Inc., Eden Prairie, MN (US)

(72) Inventors: William J. Swanson, St. Paul, MN (US); Dominic F. Mannella, Minnetonka, MN (US)

(73) Assignee: Stratasys, Inc., Eden Prairie, MN (US)

( * ) Notice: Subject to any disclaimer, the term of this patent is extended or adjusted under 35 U.S.C. 154(b) by 163 days.

(21) Appl. No.: 14/590,380

(22) Filed: Jan. 6, 2015

(65) Prior Publication Data
US 2016/0193791 A1    Jul. 7, 2016

(51) Int. Cl.
| | |
|---|---|
| *B29C 33/44* | (2006.01) |
| *B29C 33/52* | (2006.01) |
| *B29C 33/68* | (2006.01) |
| *B29C 69/00* | (2006.01) |
| *B29C 67/00* | (2017.01) |
| *B29C 37/00* | (2006.01) |
| *B33Y 10/00* | (2015.01) |
| *B33Y 40/00* | (2015.01) |

(52) U.S. Cl.
CPC ........ *B29C 67/0092* (2013.01); *B29C 33/448* (2013.01); *B29C 37/0025* (2013.01); *B29C 67/0055* (2013.01); *B29C 67/0059* (2013.01); *B29K 2829/00* (2013.01); *B33Y 10/00* (2014.12); *B33Y 40/00* (2014.12)

(58) Field of Classification Search
CPC ....... B29C 33/44; B29C 33/448; B29C 33/52; B29C 33/68; B29C 37/0025; B29C 67/0051; B29C 67/0055; B29C 67/0059; B29C 67/0092; B29C 69/00

USPC ......... 264/129, 132, 297.1, 297.8, 308, 313, 264/316, 317, 337, 338
See application file for complete search history.

(56) References Cited

U.S. PATENT DOCUMENTS

| | | |
|---|---|---|
| 5,121,329 A | 6/1992 | Crump |
| 5,169,081 A | 12/1992 | Goedderz |
| 5,173,220 A | 12/1992 | Reiff et al. |

(Continued)

FOREIGN PATENT DOCUMENTS

| | | |
|---|---|---|
| KR | 20020087250 A | 11/2002 |
| WO | 2012143923 A2 | 10/2012 |

OTHER PUBLICATIONS

International Search Report and Wirtten Opinion dated Mar. 27, 2014 for corresponding International Application No. PCT/US2013/075931, filed Dec. 18, 2013.

(Continued)

*Primary Examiner* — Leo B Tentoni
(74) *Attorney, Agent, or Firm* — Peter J. Ims; Westman, Champlin & Koehler, P.A.

(57) ABSTRACT

A method for producing three-dimensional parts, which includes printing the three-dimensional parts and associated support structures onto soluble build sheets, marking each three-dimensional part with information relating to the three-dimensional part, and removing the associated support structures and the soluble build sheets from the printed three-dimensional parts with an aqueous solution using a support removal process. The markings remain applied to the three-dimensional parts after the support removal process, and preferably do not detract from aesthetic qualities of the three-dimensional parts.

20 Claims, 3 Drawing Sheets

(56) References Cited

U.S. PATENT DOCUMENTS

| | | |
|---|---|---|
| 5,303,141 A | 4/1994 | Batchelder et al. |
| 5,312,224 A | 5/1994 | Batchelder et al. |
| 5,340,433 A | 8/1994 | Crump |
| 5,503,785 A | 4/1996 | Crump et al. |
| 5,738,817 A | 4/1998 | Danforth et al. |
| 5,764,521 A | 6/1998 | Batchelder et al. |
| 5,866,058 A | 2/1999 | Batchelder et al. |
| 5,876,550 A | 3/1999 | Feygin et al. |
| 5,900,207 A | 5/1999 | Danforth et al. |
| 5,908,184 A | 6/1999 | Scoble |
| 5,939,008 A | 8/1999 | Comb et al. |
| 5,968,561 A | 10/1999 | Batchelder et al. |
| 6,004,124 A | 12/1999 | Swanson et al. |
| 6,022,207 A | 2/2000 | Dahlin et al. |
| 6,054,077 A | 4/2000 | Comb et al. |
| 6,067,480 A | 5/2000 | Stuffle et al. |
| 6,070,107 A | 5/2000 | Lombardi et al. |
| 6,085,957 A | 7/2000 | Zinniel et al. |
| 6,129,872 A | 10/2000 | Jang |
| 6,228,923 B1 | 5/2001 | Lombardi et al. |
| 6,257,517 B1 | 7/2001 | Babish et al. |
| 6,547,995 B1 | 4/2003 | Comb |
| 6,645,412 B2 | 11/2003 | Priedeman, Jr. |
| 6,685,866 B2 | 2/2004 | Swanson et al. |
| 6,722,872 B1 | 4/2004 | Swanson et al. |
| 6,730,252 B1 | 5/2004 | Teoh et al. |
| 6,749,414 B1 | 6/2004 | Hanson et al. |
| 6,790,403 B1 | 9/2004 | Priedeman, Jr. et al. |
| 6,814,907 B1 | 11/2004 | Comb |
| 6,824,714 B1 | 11/2004 | Turck et al. |
| 6,869,559 B2 | 3/2005 | Hopkins |
| 6,923,634 B2 | 8/2005 | Swanson et al. |
| 6,976,627 B1 | 12/2005 | Culp et al. |
| 6,998,087 B1 | 2/2006 | Hanson et al. |
| 7,122,246 B2 | 10/2006 | Comb et al. |
| 7,172,715 B2 | 2/2007 | Swanson et al. |
| 7,236,166 B2 | 6/2007 | Zinniel et al. |
| 7,261,533 B2 | 8/2007 | Wrosz et al. |
| 7,306,152 B2 | 12/2007 | Culp et al. |
| 7,384,255 B2 | 6/2008 | LaBossiere et al. |
| 7,481,647 B2 | 1/2009 | Sambu et al. |
| 7,572,121 B2 | 8/2009 | Wrosz et al. |
| 7,604,181 B2 | 10/2009 | Culp et al. |
| 7,604,470 B2 | 10/2009 | LaBossiere et al. |
| 7,625,200 B2 | 12/2009 | Leavitt |
| 7,896,209 B2 | 3/2011 | Batchelder et al. |
| 7,905,408 B2 | 3/2011 | Culp et al. |
| 7,917,243 B2 | 3/2011 | Kozlak et al. |
| 7,938,351 B2 | 5/2011 | Taatjes et al. |
| 7,938,356 B2 | 5/2011 | Taatjes et al. |
| 8,033,811 B2 | 10/2011 | Swanson et al. |
| 8,070,473 B2 | 12/2011 | Kozlak |
| 8,075,300 B2 | 12/2011 | Zinniel |
| 8,153,182 B2 | 4/2012 | Comb et al. |
| 8,221,669 B2 | 7/2012 | Batchelder et al. |
| 8,226,395 B2 | 7/2012 | Pax et al. |
| 8,282,380 B2 | 10/2012 | Pax et al. |
| 8,287,794 B2 | 10/2012 | Pax et al. |
| 8,459,280 B2 | 6/2013 | Swanson et al. |
| 2005/0129941 A1 | 6/2005 | Comb et al. |
| 2005/0147781 A1 | 7/2005 | Dronzek et al. |
| 2005/0173855 A1* | 8/2005 | Dunn ............... B29C 67/0092 269/291 |
| 2005/0196525 A1 | 9/2005 | Phillips |
| 2007/0003656 A1 | 1/2007 | LaBossiere et al. |
| 2007/0013724 A1 | 1/2007 | Swift |
| 2007/0071902 A1 | 3/2007 | Dietrich et al. |
| 2007/0228590 A1 | 10/2007 | LaBossiere et al. |
| 2008/0015727 A1 | 1/2008 | Dunne et al. |
| 2008/0086947 A1 | 4/2008 | Crown |
| 2009/0035405 A1 | 2/2009 | Leavitt |
| 2009/0173443 A1 | 7/2009 | Kozlak et al. |
| 2009/0263582 A1 | 10/2009 | Batchelder |
| 2009/0273122 A1 | 11/2009 | Batchelder et al. |
| 2009/0274540 A1 | 11/2009 | Batchelder et al. |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |
| 2010/0098319 A1* | 4/2010 | Gombert ............. B42D 15/04 382/141 |
| 2010/0100222 A1 | 4/2010 | Skubic et al. |
| 2010/0100224 A1 | 4/2010 | Comb et al. |
| 2010/0283172 A1 | 11/2010 | Swanson |
| 2010/0327479 A1 | 12/2010 | Zinniel et al. |
| 2011/0074065 A1 | 3/2011 | Batchelder et al. |
| 2011/0076495 A1 | 3/2011 | Batchelder et al. |
| 2011/0076496 A1 | 3/2011 | Batchelder et al. |
| 2011/0117268 A1 | 5/2011 | Batchelder et al. |
| 2011/0121476 A1 | 5/2011 | Batchelder et al. |
| 2011/0186081 A1 | 8/2011 | Dunn et al. |
| 2011/0233804 A1 | 9/2011 | Batchelder et al. |
| 2011/0241947 A1 | 10/2011 | Scott et al. |
| 2012/0065755 A1 | 3/2012 | Steingart et al. |
| 2012/0067501 A1 | 3/2012 | Lyons |
| 2012/0068378 A1 | 3/2012 | Swanson et al. |
| 2012/0070523 A1 | 3/2012 | Swanson et al. |
| 2012/0162314 A1 | 6/2012 | Swanson et al. |
| 2012/0164256 A1 | 6/2012 | Swanson et al. |
| 2012/0201960 A1 | 8/2012 | Hartmann et al. |
| 2013/0075957 A1 | 3/2013 | Swanson et al. |
| 2013/0078073 A1 | 3/2013 | Comb et al. |
| 2013/0161432 A1 | 6/2013 | Mannella et al. |
| 2013/0161442 A1 | 6/2013 | Mannella et al. |
| 2013/0242317 A1 | 9/2013 | Leavitt et al. |
| 2014/0178588 A1 | 6/2014 | Swanson et al. |
| 2015/0375455 A1* | 12/2015 | Williams ............ B29C 67/0088 700/119 |
| 2016/0082657 A1* | 3/2016 | Swartz ............... B29C 67/0074 425/110 |

OTHER PUBLICATIONS

Thomsonbsa website, © 2000-2013: HTTP://HTTP://WWW.thomsonbsa.com/, (2013).

P Q Corporation. Metso & Britesil: Sodium Metasilicate and Polysillicate, N.p. P Q Corporation, 2004. Brochure.

* cited by examiner

ADDITIVE MANUFACTURING WITH SOLUBLE BUILD SHEET AND PART MARKING

BACKGROUND

The present disclosure relates to additive manufacturing systems and processes for printing or otherwise building three-dimensional (3D) parts with layer-based, additive manufacturing techniques. In particular, the present disclosure relates to additive manufacturing processes for automated support removal and part marking.

Additive manufacturing systems are used to print or otherwise build 3D parts from digital representations of the 3D parts (e.g., STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a method for producing a 3D part. The method includes securing a film to a platen assembly of an additive manufacturing system, printing the 3D part (and optionally a support structure) onto the secured film, disengaging the secured film from the platen assembly, removing a segment of the disengaged film having the printed 3D part from the additive manufacturing system, and exposing the 3D part, the optional support structure, and the removed segment of the film to an aqueous solution to dissolve away the segment of the film and the optional support structure from the 3D part. In some embodiments, the method also includes applying a marking to the 3D part that relates to workflow-control information for the 3D part, where the marking remains applied to the 3D part after the segment of the film is removed from the 3D part.

Another aspect of the present disclosure is directed to a method for producing a 3D part, which includes securing a film to a platen assembly of an additive manufacturing system, printing a support structure and the 3D part onto the secured film, and applying a marking to the 3D part (e.g., with an ultraviolet-fluorescent material). The method also includes exposing the support structure and the 3D part with the applied marking to an aqueous solution to remove the support structure from the 3D part, where the marking remains applied to the 3D part after removing the support structure. The method further includes reading the marking on the 3D part after removing the support structure, and performing at least one post-printing operation based on the read marking.

Another aspect of the present disclosure is directed to a method for producing 3D parts with a printing farm. The method includes operating multiple additive manufacturing systems of the printing farm to print the 3D parts and associated support structures onto soluble build sheets, marking each 3D part with information relating to the 3D part, and removing the associated support structures and the soluble build sheets from the printed 3D parts with an aqueous solution in one or more support removal systems. The method also includes reading the markings on the 3D parts after the associated support structures and the soluble build sheets are removed, and performing one or more post-printing operations on the 3D parts based on the read markings.

DEFINITIONS

Unless otherwise specified, the following terms as used herein have the meanings provided below:

The term "polymer" refers to a polymeric material having one or more monomer species, including homopolymers, copolymers, terpolymers, and the like.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyvinyl alcohol is interpreted to include one or more polymer molecules of the polyvinyl alcohol, where the polymer molecules may or may not be identical (e.g., different molecular weights and/or isomers).

Unless otherwise specified, temperatures referred to herein are based on atmospheric pressure (i.e. one atmosphere).

The term "additive manufacturing system" refers to a system that prints, builds, or otherwise produces 3D parts and/or support structures at least in part using an additive manufacturing technique. The additive manufacturing system may be a stand-alone unit, a sub-unit of a larger system or production line, and/or may include other non-additive manufacturing features, such as subtractive-manufacturing features, pick-and-place features, two-dimensional printing features, and the like.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The terms "printing onto", "printing on" such as for "printing a 3D part on a film" include direct and indirect printings onto the film. A "direct printing" involves depositing a flowable material directly onto the film to form a layer that adheres to the film. In comparison, an "indirect printing" involves depositing a flowable material onto intermediate layers that are directly printed onto the film. As such, unless otherwise specified, printing a 3D part onto a film may include (i) a situation in which the 3D part is directly printed onto to the film, (ii) a situation in which the 3D part is directly printed onto intermediate layer(s) (e.g., of a support structure), where the intermediate layer(s) are directly printed onto the film, and (iii) a combination of situations (i) and (ii).

The term "providing", such as for "providing a film", when recited in the claims, is not intended to require any particular delivery or receipt of the provided item. Rather, the term "providing" is merely used to recite items that will be referred to in subsequent elements of the claim(s), for purposes of clarity and ease of readability.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The terms "about" and "substantially" are used herein with respect to measurable values and ranges due to expected variations known to those skilled in the art (e.g., limitations and variabilities in measurements).

DETAILED DESCRIPTION

Figure 1:
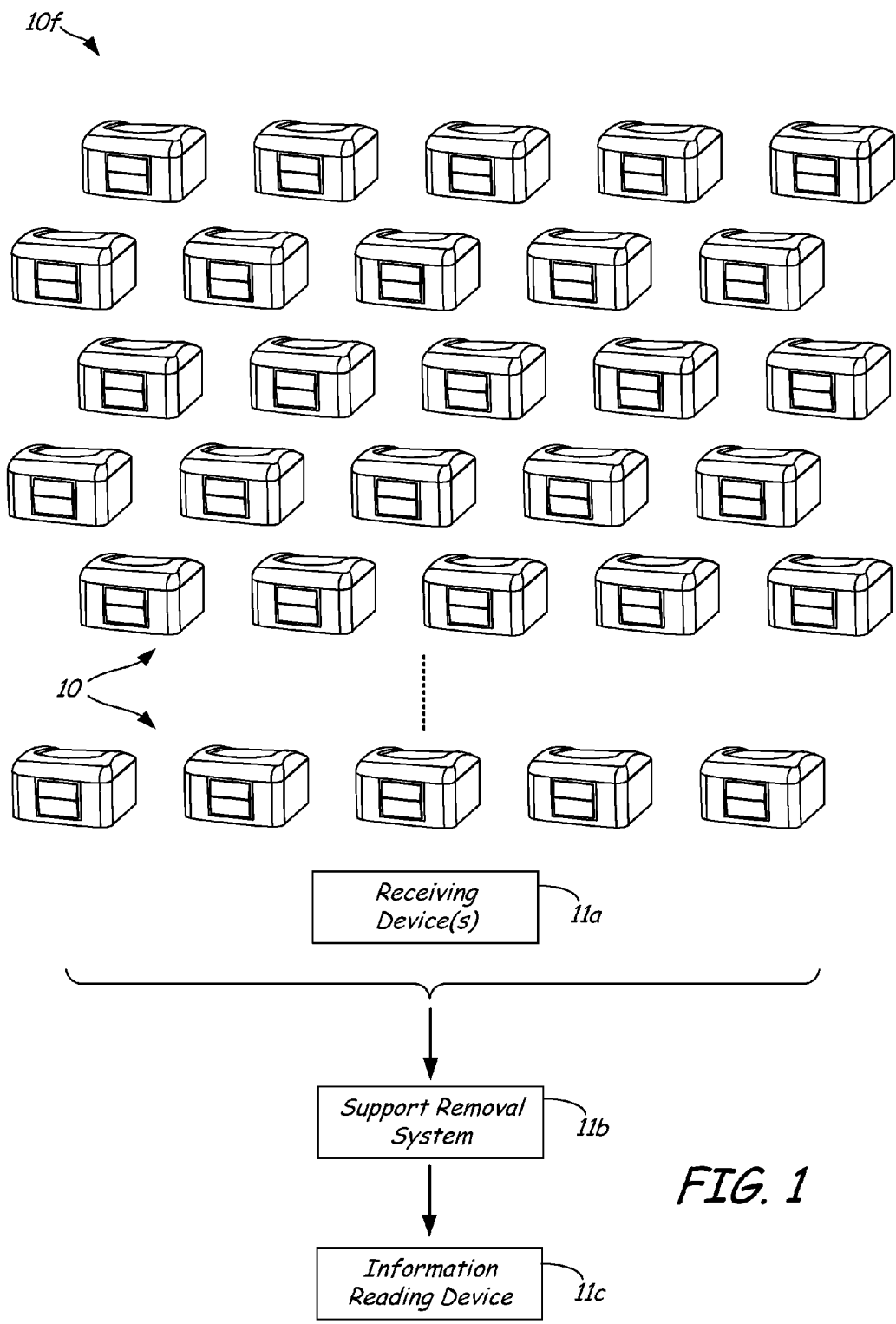
FIG. 1 is a schematic illustration of a printing farm that includes a plurality of automated additive manufacturing system of the present disclosure.

The present disclosure is directed to a process for printing 3D parts and support structures using an additive manufacturing system, and for removing the support structures from the 3D parts in a hands-free manner, where one or both of the printing and support removal processes are preferably performed in an automated manner. In a first embodiment, the process involves printing layers of the 3D parts and support structures onto a soluble build sheet in the additive manufacturing system. In this embodiment, the build sheet is preferably provided as a continuous film capable of functioning as a receiving surface for the printed layers in the additive manufacturing system. The build sheet is also preferably soluble in an aqueous support removal solution, such as an alkaline aqueous solution. As such, after the printing operation finishes, the soluble build sheet may be dissolved in the support removal solution along with the support structure.

In a second embodiment, which may be independent of the soluble build sheets, or more preferably, used in combination with this feature, the process involves marking a 3D part with information (e.g., barcodes, dot matrix codes, alphanumeric characters, and the like), preferably for workflow control after the support structure is removed from the additive manufacturing system. In this embodiment, the information may be marked on the 3D part in a manner that does not visually detract from the aesthetics of the finished 3D part. The marking is also preferably capable of surviving the support removal process without erasing or otherwise removing from the 3D part.

For instance, the 3D part may be marked with a material that is not visible to the naked eye under normal lighting conditions, but is otherwise visible when illuminated under particular lighting conditions, such as an ultraviolet (UV)-fluorescent material. Surprisingly, these materials can survive exposure to alkaline aqueous solutions (e.g., aqueous sodium hydroxide solutions) without being erased from the printed 3D parts.

The soluble build sheets and the part markings are effective techniques for increasing the automation of the printing and support removal process. In a conventional additive manufacturing system, a user is typically required to manually remove a printed 3D part and support structure from the system, separate the underlying build sheet, and place the printed 3D part/support structure in a support removal tank. Separating the build sheet, however, can be a tedious and manually laborious process, particularly when operating many additive manufacturing systems in parallel.

In comparison, the soluble build sheet is capable being removed from the 3D part along with the soluble support structure in a hands-free manner, such as by immersion into an aqueous solution of a support removal tank. This can preclude the need for the manual removal of the build sheet prior to the support removal. Furthermore, the dissolved composition of the soluble build sheet can optionally be recollected from the support removal tank and recycled to reduce material waste.

As can be appreciated, when printing a large number of 3D parts, it can become difficult to track each 3D part as it proceeds from the additive manufacturing system, to a support removal system, any post-processing system, and then packaging and shipping. This can be particularly true when the support removal tank is a communal tank for receiving a large number 3D parts and support structures.

One current technique to overcome this issue involves either writing workflow information on the build sheet (e.g., with an ink marker), or printing the information on the build sheet (e.g., as a printed bar code of the part material). However, if the build sheet itself is also soluble in the support removal solution, then the effectiveness of this technique is limited since the information will not remain attached to the 3D part. Furthermore, writing information on a 3D part itself with standard ink can be aesthetically unappealing, and can be unacceptable to many customers.

Instead, as briefly discussed above, the 3D part itself can be marked with information (e.g., workflow-control information) in a manner that does not visually detract from the aesthetics of the finished 3D part, and that is capable of surviving the support removal process without erasing or otherwise removing from the 3D part. As such, the information can subsequently be read and used for workflow control purposes, for example, during the post-printing and post-support removal operations.

The processes utilizing the soluble build sheets and the part markings may be used with any suitable additive manufacturing system and support removal system. In preferred embodiments, the additive manufacturing and support removal systems may be incorporated into a printing farm, such as printing farm 10f illustrated in FIG. 1. As shown, printing farm 10f includes multiple additive manufacturing systems 10, where at least a portion of the systems 10, and more preferably each system 10, prints and removes 3D parts and associated support structures in an automated manner without requiring user intervention. Examples of suitable additive manufacturing systems and printing farms for system 10 and printing farm 10f include those disclosed in Swanson et al., U.S. Publication No. 2014/0178588, which is incorporated by reference.

After each 3D part and support structure is printed and removed from one of the systems 10, such as with one or more receiving devices 11a (e.g., receptacles, conveyor mechanisms, etc. . . . ), the support structure and soluble build sheet associated with the 3D part may be removed in a hands-free manner, and the 3D part may optionally undergo one or more post-processing steps. Accordingly, printing farm 10f is suitable for use with one or more support removal systems 11b, such as those disclosed in Swanson et al., U.S. Pat. No. 8,459,280; and Dunn et al., U.S. Publication No. 2011/0186081; each of which is incorporated by reference. Printing farm 10f may also be used with one or more information reading devices 11c, which may read the information from the markings on the 3D parts, such as for workflow control purposes.

As discussed below, each system 10 may include a platform assembly and a removal assembly, which may draw successive segments of a film for the soluble build sheets from a spool supply (or other supply source). Briefly, the platform assembly and the removal assembly may engage each other to draw the film across a top surface of the platform assembly, where the film is then preferably restrained against the top surface to function as the build sheet. The system 10 may then print a 3D part (or multiple 3D parts) and, optionally, one or more support structures on the restrained build sheet.

After the printing operation is completed, the platform assembly may release the build sheet, and the removal assembly may then draw the build sheet from the platform assembly and cut the build sheet to separate the segment retaining printed 3D part from the remainder of the film. The cut build sheet segment with the printed 3D part may then exit the system and be received by receiving device(s) 11a (e.g., dropped out of the system into a bin, other receptacle, or a conveyor mechanism). In some embodiments, such as those in which the system 10 includes a heated chamber, the system 10 may also include an automated door. In these embodiments, the given system 10 may also open the automated door, allowing the cut film segment with the printed 3D part to exit from the system 10.

The 3D part may be marked with the information at any suitable point during or after the printing operation. In some applications, the marking may be jetted, extruded, or otherwise applied on the printed layers during and/or after the printing operation, within system 10. Alternatively (or additionally), the markings may be applied to the finished 3D part after exiting system 10, but prior to the support structure and soluble build sheet being removed, such as at receiving device(s) 11a.

The information may be marked on the 3D part using any suitable encoding scheme that can be read by an optical scanner (not shown) and/or a user, such as with barcodes, dot matrix codes, alphanumeric characters, and the like. The information encoded in the markings may include any suitable details relating to the 3D part. For example, the markings may include tracking and/or routing information for directing where the 3D part may be transported to after exiting system 10, such as with one or more receiving devices 11a (e.g., receptacles, conveyor mechanisms, etc. . . . ). This is particularly suitable for use with a printing farm 10f of systems 10 where receiving devices 11a (or other devices in the farm 100) may include scanners for routing the printed 3D parts to desired locations in the processing line.

Additionally (or alternatively), the markings may include information relating to one or more post-printing operations to be performed on the 3D part, such as support removal operations, cooling operations, cleaning operations, machining, benching, painting, packaging, shipping, and combinations thereof. The markings may also include identification information for the 3D part, such as customer information, digital part information, batch and lot numbers, purchase information, part identification information, job queue orders, and other similar types of identification details.

The markings may also include information relating to a variety of additional manufacturing steps in an overall manufacturing process. For example, system 10 may be a single step of multiple steps in a manufacturing process (e.g., a digital manufacturing process). As such, the information retained by the markings may be used to assist in performing the subsequent steps in the manufacturing process. In some applications, the markings may provide tracking and processing instructions for a variety of subsequent manufacturing steps, such as painting, machining, gluing, annealing, metrology, stressing, plating, and combinations thereof.

After exiting system 10 (and after the markings are applied), the resulting printed 3D part with the associated support structure and soluble build sheet may be placed in one of the support removal systems 11b, manually or in an automated manner. For instance, the printed 3D part, support structure, and soluble build sheet may be immersed in or otherwise exposed to (e.g., sprayed with) an aqueous solution in the support removal systems 11b.

Examples of suitable aqueous solutions include water and alkaline aqueous solutions, such as aqueous solutions of sodium hydroxide, silicate salts (e.g., sodium metasilicate), and combinations thereof. In some embodiments, alkaline aqueous solutions derived from silicate salts such as sodium metasilicate are preferred. It has been found that these solutions are particularly suitable for use in applications where sodium hydroxide ions are not desired, and/or where the support removal tanks may otherwise be susceptible to corrosive environments. In any embodiment, the aqueous solution accordingly dissolves at least a portion of the support structure and the soluble build sheet, and more preferably, completely removes the support structure and the soluble build sheet from the 3D part.

The markings, however, remain applied to the resulting 3D part after the support structure and/or the build sheet are removed. This allows information (e.g., workflow-control information) for the 3D part to be subsequently read manually and/or with an automated optical scanner (e.g., using UV-light fluorescence). As such, even after the support structure and build sheet are removed, workflow-control information for the 3D part may still be read and used for one or more post-printing operations.

Figure 2:
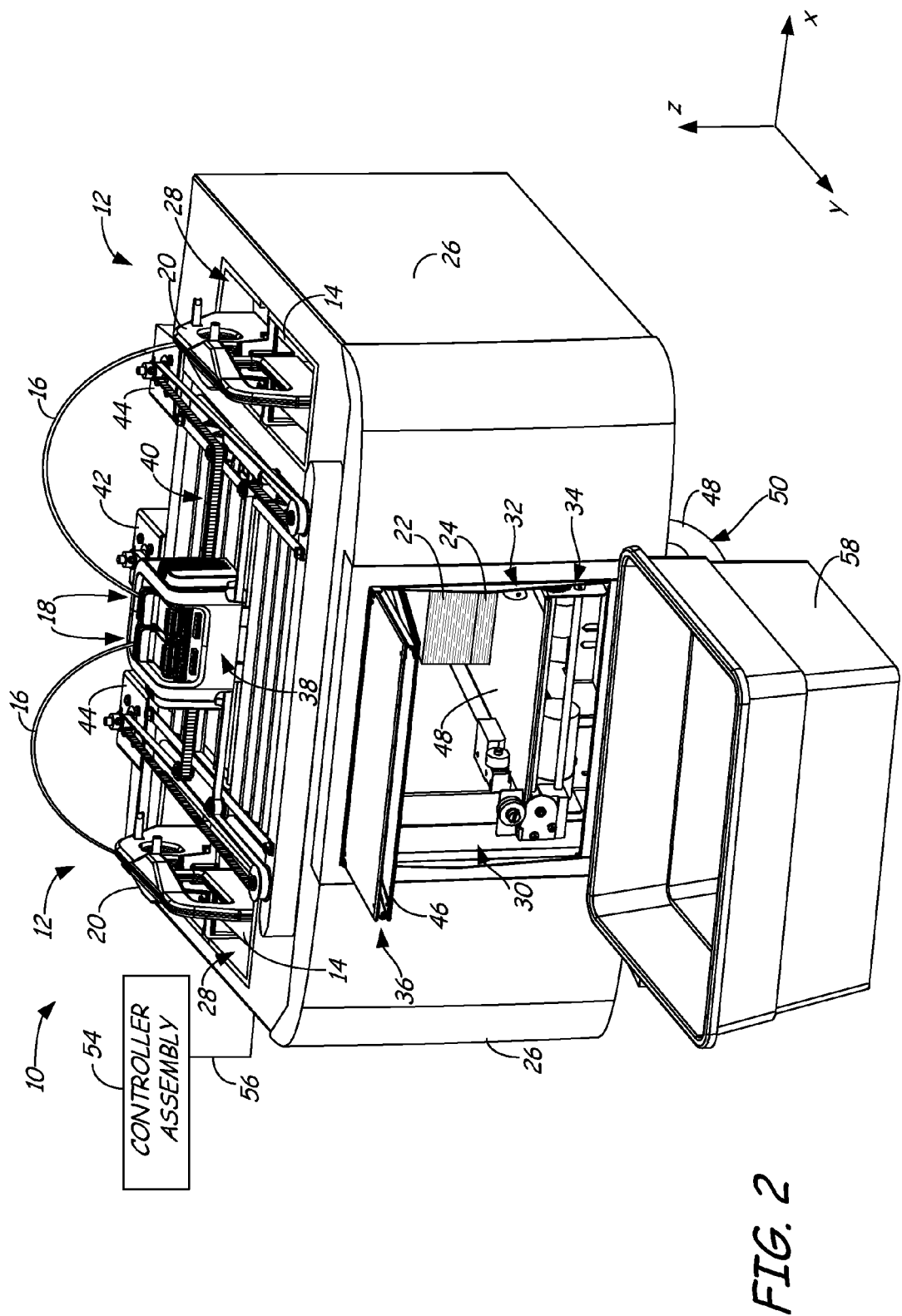
FIG. 2 is a top, front perspective view of an automated additive manufacturing system of the present disclosure in use with consumable assemblies.

FIG. 2 shows an example system 10 in use with two consumable assemblies 12, where system 10 is configured to print and remove 3D parts and support structures in an automated manner, preferably without user intervention. Each consumable assembly 12 is an easily loadable, removable, and replaceable container device that retains a supply of a consumable filament for printing with system 10. Typically, one of the consumable assemblies 12 contains a part material filament ("part material consumable assembly"), and the other consumable assembly 12 contains a support material filament ("support material consumable assembly"). However, both consumable assemblies 12 may be identical in structure.

In the shown embodiment, each consumable assembly 12 includes container portion 14, guide tube 16, print head 18, and handle 20. Container portion 14 may retain a spool or coil of a consumable filament, such as discussed in Mannella et al., U.S. Publication Nos. 2013/0161432 and 2013/0161442. In some embodiments, container portions 14 of consumable assemblies 12 may retain large supplies of the consumable filaments. This is particularly suitable for use in a printing farm of automated systems 10 to increase the duration between change-overs of each consumable assembly 12.

Guide tube 16 interconnects container portion 14 and print head 18, where the drive mechanism of print head 18 draws successive segments of the consumable filament from container portion 14 and through guide tube 16. In this embodiment, guide tube 16 and print head 18 are subcomponents of consumable assembly 12, and may be interchanged to and from system 10 with each consumable assembly 12. In alternative embodiments, guide tube 16 and/or print head 18 may be components of system 10, rather than subcomponents of consumable assemblies 12.

System 10 is an additive manufacturing system for printing 3D parts or models and corresponding support structures (e.g., 3D part 22 and support structure 24) from the part and support material filaments, respectively, of consumable assemblies 12, using a layer-based, additive manufacturing technique; and for removing the printed 3D parts and support structures in an automated manner. Suitable additive manufacturing systems for system 10 include extrusion-based systems developed by Stratasys, Inc., Eden Prairie, Minn. under the trademark "FDM". As shown, system 10 includes system casing 26, two bays 28, chamber 30, platen assembly 32, removal assembly 34, door assembly 36, head carriage 38, head gantry 40, z-axis motor 42, and a pair of x-y motors 44.

System casing 26 is a structural component of system 10 and may include multiple structural sub-components such as support frames, housing walls, and the like. In the shown embodiment, system casing 26 defines the dimensions of bays 28, and of chamber 30. Bays 28 are container bays configured to respectively receive container portions 14 of consumable assemblies 12. Typically, each of bays 28 may be intended to receive either a part material consumable assembly 12 or a support material consumable assembly 12. In an alternative embodiment, bays 28 may be omitted to reduce the overall footprint of system 10. In this embodiment, container portions 14 may stand adjacent to system casing 26, while providing sufficient ranges of movement for guide tubes 16 and print heads 18. Bays 28, however, provide convenient locations for loading consumable assemblies 12.

Chamber 30 is an enclosable environment that contains platen assembly 32 and removal assembly 34 for printing 3D part 22 and support structure 24, as discussed below. Chamber 30 may be heated (e.g., with circulating heated air) to reduce the rate at which the part and support materials solidify after being extruded and deposited (e.g., to reduce distortions and curling), or otherwise maintained to provide a controlled environment. In alternative embodiments, chamber 30 may be omitted and/or replaced with different types of heated, cooled, and/or ambient build environments. For example, 3D part 22 and support structure 24 may be built in a build environment that is open to ambient conditions or may be enclosed with alternative structures (e.g., flexible curtains).

In the shown embodiment, chamber 30 is accessible through door assembly 36, which, in the shown embodiment, includes bi-fold door 46 (shown in an open state). Door assembly 36 allows the printed 3D part 22 and support structure 24 to be removed from system 10 in an automated manner via platen assembly 32 and removal assembly 34, as discussed below. While illustrated with bi-fold door 46, door assembly 36 may alternatively include different automated door designs, such as accordion-based doors, hinged doors, and the like.

Platen assembly 32 is supported by a platen gantry of system 10 (not shown in FIG. 2), where the platen gantry is configured to move platen assembly 32 along (or substantially along) the vertical z-axis and is powered by z-axis motor 42. Platen assembly 32 is configured to receive and restrain film 48, which is a flexible film that functions as a series of the soluble build sheets.

As mentioned above, each successive build sheet from film 48 preferably functions as a receiving surface for printing 3D part 22 and support structure 24, where film 48 may be drawn from a spool supply 50 that may be located outside of chamber 30 and/or system 10. Film 48 preferably exhibits good bond strengths to support structure 24, allowing support structure 24 to anchor 3D part 22 to reduce the effects of curling and other distortions. Alternatively, in embodiments in which support structure 24 is not used, film 48 preferably exhibits good bond strengths to 3D part 22 to directly anchor 3D part 22 to reduce the effects of curling and other distortions.

Suitable materials for film 48 include polymeric materials that are at least partially soluble in an aqueous solution, such as water or an alkaline aqueous solution. More preferably, the polymeric materials for film 48 are substantially soluble in the aqueous solution, allowing the resulting build sheet to dissolve in support removal system(s) 11b.

Examples of suitable polymeric materials for film 48 include polyvinyl alcohols, acrylate and acrylic-acid based polymers, such as copolymers polymerized from monomers of carboxylic acids (e.g., acrylic acid and methacrylic acid), ionic salts of carboxylic acids (e.g., neutralized salts of acrylic acid and/or methacrylic acid), alkyl acrylates (e.g., methyl acrylate and butyl acrylate), alkyl methacrylates (e.g., methyl methacrylate), and combinations thereof. In some embodiments, the polymeric materials may also include aromatic-based monomer units, such as from styrene. For instance, film 48 may include a terpolymer of styrene, methacrylic acid, and buytl acrylate.

Film 48 may also compositionally include one or more additives, such as one or more impact modifiers (e.g., polymeric impact modifiers), plasticizers, processing agents (for manufacturing film 48), and/or colorants. In these embodiments, the one or more additives may constitute from about 0.1% by weight to about 15% by weight of the composition for film 48, and more preferably from about 1% to about 10% by weight of the composition. The above-discussed polymeric material(s) may constitute the remainder of the composition.

Examples of suitable film thicknesses for film 48 range from about 0.5 mils to about 5 mils, and more preferably from about 1 mil to about 3 mils. These ranges are suitable to maintain good film durability to prevent premature tearing, while also maintaining good flexibility and low volume-to-surface area ratios for fast dissolution rates.

In comparison to platen assembly 32, in the shown embodiment, removal assembly 34 is preferably secured to the front end of chamber 30, adjacent to door assembly 36. As such, the movement of platen assembly 32 along the vertical z-axis may engage and disengage platen assembly 32 to and from removal assembly 34, as discussed in Swanson, U.S. Publication No. 2014/0178588. In an alternative embodiment, removal assembly 34 may be secured to the front end of platen assembly 32, allowing removal assembly 34 to move along the vertical z-axis with platen assembly 32. However, removal assembly 34 and spool supply 50 are preferably separate from platen assembly 32, thereby reducing the weight of platen assembly 32, and remain fixed relative to chamber 30.

Head carriage 38 is a unit configured to receive one or more removable print heads, such as print heads 18, and is supported by head gantry 40. Examples of suitable devices for head carriage 38, and techniques for retaining print heads 18 in head carriage 38, include those disclosed in Swanson et al., U.S. Publication Nos. 2010/0283172 and 2012/0164256.

As mentioned above, in some embodiments, guide tube 16 and/or print head 18 may be components of system 10, rather than subcomponents of consumable assemblies 12. In these embodiments, additional examples of suitable devices for print heads 18, and the connections between print heads 18 and head gantry 40 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182. Moreover, in alternative embodiments, print heads 18 may utilize different deposition-based additive manufacturing techniques. For example, print heads 18 may be inkjet-based print heads, each having one or more arrays of inkjet orifices to print 3D part 22 and support structure 24.

In the shown embodiment, head gantry 40 is a belt-driven gantry assembly configured to move head carriage 38 (and the retained print heads 18) in (or substantially in) a horizontal x-y plane above chamber 30, and is powered by x-y motors 44. In an alternative embodiment, platen assembly 32 may be configured to move in the horizontal x-y plane within chamber 30, and head carriage 38 (and print heads 18) may be configured to move along the z-axis. Other similar arrangements may also be used such that one or both of platen assembly 32 and print heads 18 are moveable relative to each other. Platen assembly 32 and head carriage 38 (and print heads 18) may also be oriented along different axes. For example, platen assembly 32 may be oriented vertically and print heads 18 may print 3D part 22 and support structure 24 along the x-axis or the y-axis.

System 10 also includes controller assembly 54, which is one or more control circuits configured to monitor and operate the components of system 10 (and optionally, receiving device(s) 11a, support removal system(s) 11b, and/or information reading device(s) 11c). For example, one or more of the control functions performed by controller assembly 54 can be implemented in hardware, software, firmware, and the like, or a combination thereof. Controller assembly 54 may communicate over communication line 56 with print heads 18, chamber 30 (e.g., with a heating unit for chamber 30), removal assembly 34, door assembly 36, head carriage 38, motors 42 and 44, and various sensors, calibration devices, display devices, and/or user input devices.

In some embodiments, controller 54 may also communicate with one or more of bays 28, platen assembly 32, head gantry 40, and any other suitable component of system 10. In further embodiments, controller 54 may also direct the operation of platen assembly 32, removal assembly 34 and/or door assembly 36 based on information received from other components of system 10.

While illustrated as a single signal line, communication line 56 may include one or more electrical, optical, and/or wireless signal lines, allowing controller assembly 54 to communicate with various components of system 10. Furthermore, while illustrated outside of system 10, controller assembly 54 and communication line 56 may be internal components to system 10. Controller assembly 54 may also include one or more computer-based systems having computer-based hardware, such as data storage devices, processors, memory modules and the like for generating, storing, and transmitting tool path and related printing instructions to system 10.

Figure 3:
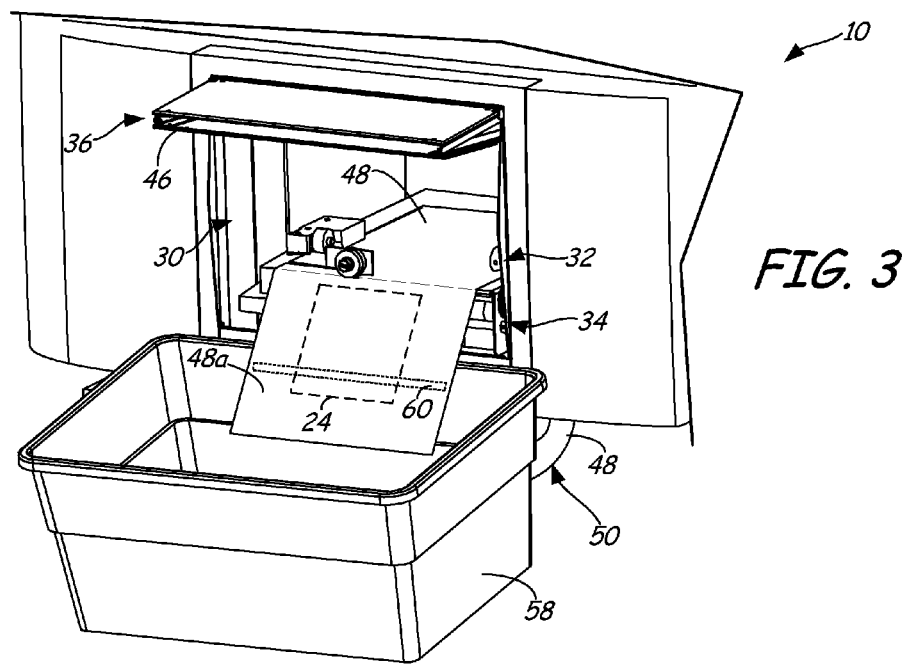
FIG. 3 is a schematic illustration of the system, as shown in FIG. 2, depicting a process for printing and removing a 3D part and support structure with soluble build sheet.

System 10 is also shown in use with bucket 58 retained by casing 26 adjacent to door assembly 36. Bucket 58 is a receptacle configured to receive the printed 3D part 22 and support structure 24 when removed from system 10, and may be a component of receiving device(s) 11a. After 3D part 22 and support structure 24 are printed, removal system 34 preferably draws film 48 until the segment of film 48 retaining the printed 3D part 22 and support structure 24 passes removal assembly 34 and extends through the opening of door assembly 36, as shown in FIG. 3. Removal system 34 then cuts film 48, allowing the printed 3D part 22, support structure 24, and the cut build sheet segment (referred to as build sheet 48a) to fall into bucket 58.

In alternative embodiments, bucket 58 may be replaced by other suitable devices for receiving the removed 3D part 22, support structure 24, and build sheet 48a. For example, bucket 58 may be replaced with support removal system 11b, which may optionally communicate with controller assembly 54. In this embodiment, 3D part 22, support structure 24, and build sheet 48s may drop out of chamber 30 and into support removal system 11b to remove support structure 24 and build sheet 48a from 3D part 22, also preferably in an automated manner. As mentioned above, examples of suitable systems for support removal system 11b include those disclosed in Swanson et al., U.S. Pat. No. 8,459,280; and Dunn et al., U.S. Publication No. 2011/0186081.

In a further alternative embodiment, bucket 58 may be replaced with a conveyor mechanism, where the removed 3D part 22, support structure 24, and build sheet 48a may drop onto a conveyor belt, which transports the received 3D part 22, support structure 24, and build sheet 48a to a desired location away from system 10. This is suitable for use with a printing farm of systems 10, such as printing farm 10f shown in FIG. 1, where a network of conveyor belts may transport the 3D parts and support structures from the individual systems 10 to one or more locations for further processing (e.g., support removal).

3D part 22 may be marked with the information (e.g., workflow-control information) using any suitable technique. In one preferred embodiment, the information is marked on (or in) 3D part 22 with a UV-fluorescent material that is substantially invisible to the naked eye under normal lighting conditions. Examples of suitable UV-fluorescent materials include those that absorb electromagnetic radiation in the ultraviolet spectrum, such as wavelengths from about 10 nanometers (nm) to about 400 nm, more preferably from about 200 nm to about 300 nm, and even more preferably from about 230 nm to about 270 nm. When illuminated with UV-wavelength light, these materials may then emit light in the visible spectrum, allowing a user or optical scanner to read the identification information.

In other embodiments, the information is marked on (or in) 3D part 22 with other fluorescing materials, such as infrared-fluorescent materials and/or near-infrared-fluorescent materials, which are preferably substantially invisible to the naked eye under normal lighting conditions. In further embodiments, the information is marked on (or in) 3D part 22 with a light absorbing material, such as an infrared-absorbing material, that traces an outline of the information. In this case, when exposed to electromagnetic radiation in the appropriate spectrum, the marked information within the traced outline of the absorbing material will reflect, while the traced outline will not. The reflected light of the marked information can then be read by an associated image sensor.

As mentioned above, 3D part 22 may be marked with the information at any suitable point during or after the printing operation, and prior to reaching support removal system(s) 11b. For example, one or more print heads 18 of system 10 may jet, extrude, or otherwise deposit a flowable material (e.g., the UV-fluorescent material) for marking 3D part 22 inside chamber 30 during the printing operation and/or after the printing operation is completed. In this embodiment, the markings may be applied to one or more exterior surfaces of 3D part 22.

In some cases, such as when 3D part 22 is printed from light-colored and/or translucent part materials, the markings may be applied to one or more layers within 3D part 22, so long as the markings can receive the UV radiation and fluoresce through the given layers. For instance, the markings may be applied within one to five layers and/or road widths from a surface of 3D part 22, and more preferably within one to three layers and/or road widths from the surface. In these embodiments, a dark-colored part material may alternatively be used (e.g., a dark-colored thermoplastic material), which can be visibly detected under bright lighting conditions, but can otherwise remain substantially hidden during normal lighting conditions.

Furthermore, these interior markings may be processed (and/or post-processed) into to the tool-path geometries of the part layers. For example, when utilizing an extrusion-based system that prints each layer of 3D part 22 in a series of roads, the information is preferably marked in a raster-fill pattern of a layer that is laterally within the perimeter roads of the layer. In other words, the fill pattern for the for the layer that is generated by the processing software, can also generate the tool path geometry for the markings. This can further reduce the visibility of the markings to the naked eye.

Alternatively (or additionally), the markings may be applied to the finished 3D part 22 after exiting system 10, such as at receiving device(s) 11a. This embodiment is beneficial for use with marking materials that are temperature sensitive and may thermally degrade and/or evaporate in system 10 during the printing operation.

For example, system 10, receiving device(s) 11a, or/any other suitable device in the production line (prior to reaching support removal system(s) 11b) may also include one or more printer units 60 configured to print the markings on the top surface and/or a side surface of 3D part 22 as build sheet 48a exits system 10. This printing may, for example, occur after film 48 is advanced out of system 10, as shown in FIG. 3, but prior to removal system 34 cutting film 48 with the printed 3D part 22 and support structure 24.

In other aspects, receiving device(s) 11a may include a conveyor mechanism that moves the finished 3D part 22, support structure 24, and build sheet 48a past one or more printer units to mark 3D part 22 with the information. In any of these embodiments, the printer units (e.g., printer unit(s) 60) may also communicate with controller assembly 54 to coordinate the markings with the correct 3D part 22.

In yet further aspects, the markings of the information for 3D part 22 may initially be applied to the build sheet segment of film 48 prior to or during the printing operation, such as discussed in Swanson et al., U.S. Publication No. 2014/0178588. Then, after the finished 3D part 22, support structure 24, and build sheet 48a exit system 10 into bucket 58 (or any other suitable receiving device 11a), the markings on build sheet 48a may be read and copied onto 3D part 22, such as with the UV-fluorescent material. This copy and marking process may be performed manually and/or in an automated manner with an optical scanner and one or more printer units (e.g., printer unit(s) 60).

The data for the markings may be generated using a computer system (e.g., of controller assembly 54) by identifying the location on film 48 that 3D part 22 (or multiple 3D parts 22) will cover. The computer system may then generate encoded information using a desired encoding scheme, and then generate printing data for applying the markings based on the encoded information. The generated printing data may then be transmitted from the computer system to system 10 and/or any downstream printer unit(s) (e.g., printer unit(s) 60), and the markings may be applied to 3D part 22 based on the generated print data.

In an alternative embodiment, the marking applied to 3D part 22 may be printed with system 10 as a sacrificial surface extension to 3D part 22. In this embodiment, the marking may be printed with a print head 18 from the part material in a manner that allows the marking to remain attached to 3D part 22 during the support removal process. For instance, the marking may be connected to 3D part 22 with a perforated connection or otherwise weak bond that is strong enough to withstand the support removal process in support removal system 11b. However, the bond can otherwise be stripped or broken apart without requiring excessive force, and preferably without damaging the surface of 3D part 22.

The marking may be printed using any suitable geometry, such as barcodes, dot matrix codes, alphanumeric characters, and the like. This embodiment also allows workflow-control information to be retained by 3D part 22 during and after the support removal process. Additionally, when subsequently removed, 3D part 22 may retain its original aesthetic features.

As discussed above, the processes utilizing the soluble build sheets and the part markings may be used with any suitable additive manufacturing system and support removal system, and are particularly beneficial for use with automated systems, such as in printing farm 10f. The soluble build sheets (e.g., film 48 and build sheet 48a) are capable being removed from the 3D parts along with the soluble support structures in a hands-free manner, which can preclude the need for the manual removal of the build sheets prior to the support removal. Furthermore, the part markings allow the 3D parts to be tracked as they proceed from the additive manufacturing systems, through the support removal systems, and to any post-processing, packaging, and shipping steps. Furthermore, the markings do not visually detract from the aesthetics of the finished 3D parts, thereby preserving the printing qualities of the 3D parts.

Although the present disclosure has been described with reference to preferred embodiments, workers skilled in the art will recognize that changes may be made in form and detail without departing from the spirit and scope of the disclosure.

The invention claimed is:

1. A method for producing a three-dimensional part, the method comprising:
   securing a film to a platen assembly of an additive manufacturing system;
   printing the three-dimensional part onto the secured film;
   removing the film having the printed three-dimensional part from the additive manufacturing system; and
   exposing the three-dimensional part and the film to a solvent to at least partially dissolve the film to remove the film from the three-dimensional part.

2. The method of claim 1, and further comprising printing a support structure onto the secured film in coordination with printing the three-dimensional part, wherein exposing the three-dimensional part and the film to the solvent also exposes the support structure to the solvent to remove the support structure from the three-dimensional part.

3. The method of claim 1, wherein the solvent comprises an alkaline aqueous solution.

4. The method of claim 3, wherein the alkaline aqueous solution comprises a solution comprising sodium hydroxide, a silicate salt, or a combination thereof.

5. The method of claim 4, wherein the silicate salt comprises sodium metasilicate.

6. The method of claim 1, wherein the film compositionally comprises a polyvinyl alcohol.

7. The method of claim 1, wherein the film compositionally comprises a copolymer polymerized from monomers of carboxylic acids, ionic salts of carboxylic acids, alkyl acrylates, alkyl methacrylates, aromatic momoners, or combinations thereof.

8. The method of claim 1, and further comprising applying a marking to the three-dimensional part that relates to workflow-control information for the three-dimensional part, wherein the marking remains applied to the three-dimensional part after the film is removed from the three-dimensional part.

9. A method for producing a three-dimensional part, the method comprising:
   securing a film to a platen assembly of an additive manufacturing system, wherein the film comprises a soluble material;
   printing a support structure and at least a portion of the three-dimensional part onto the secured film;
   applying a marking to a surface of the three-dimensional part with a material that is substantially invisible to the naked eye;
   exposing the film, the support structure, and the three-dimensional part with the applied marking to solvent to at least partially dissolve the film to remove the support structure with the film from the three-dimensional part, wherein the marking remains applied to the three-dimensional part after removing the support structure;
   reading the marking on the three-dimensional part after removing the support structure; and
   performing at least one post-printing operation based on the read marking.

10. The method of claim 9, and further comprising:
    encoding information with a computer system using an encoding scheme;
    generating, with the computer system, printing data for the marking based on the encoded information; and
    transmitting, with the computer system, the generated printing data for the marking to the additive manufacturing system or to a post-printing device for applying the marking to the three-dimensional part.

11. The method of claim 9, and further comprising removing the support structure and the three-dimensional part from the additive manufacturing system, wherein applying the marking to the three-dimensional part comprises applying the marking onto a surface of the three-dimensional part after being removed from the additive manufacturing system.

12. The method of claim 9, wherein applying the marking to the three-dimensional part comprises jetting the marking onto the three-dimensional part with a jetting print head of the additive manufacturing system.

13. The method of claim 9, wherein the material comprises an ultraviolet-fluorescent material, and wherein reading the marking on the three-dimensional part comprises illuminating the marking with an ultraviolet-wavelength light.

14. A method for producing three-dimensional parts with a printing farm, the method comprising:
    operating multiple additive manufacturing systems of the printing farm to print the three-dimensional parts and associated support structures onto soluble build sheets;
    marking each three-dimensional part with information relating to the three-dimensional part;
    removing the associated support structures and the soluble build sheets from the printed three-dimensional parts with a solvent in one or more support removal systems;
    reading the markings on the three-dimensional parts after the associated support structures and the soluble build sheets are removed; and
    performing one or more post-printing operations on the three-dimensional parts based on the read markings.

15. The method of claim 14, wherein marking each three-dimensional part comprises applying the marking with an ultraviolet-fluorescent material.

16. The method of claim 15, wherein reading the markings on the three-dimensional parts comprises illuminating the markings with an ultraviolet-wavelength light.

17. The method of claim 14, wherein marking each three-dimensional part comprises printing the marking with the additive manufacturing system as an extension of the three-dimensional part.

18. The method of claim 14, wherein the solvent comprises an alkaline aqueous dispersion.

19. The method of claim 18, wherein the alkaline aqueous dispersion comprises sodium hydroxide, a silicate salt, or a combination thereof.

20. The method of claim 14, wherein the soluble build sheet compositionally comprises a copolymer polymerized from monomers of carboxylic acids, ionic salts of carboxylic acids, alkyl acrylates, alkyl methacrylates, aromatic momoners, or combinations thereof.

* * * * *